(12) United States Patent
McDade et al.

(10) Patent No.: US 9,139,733 B2
(45) Date of Patent: Sep. 22, 2015

(54) COLD MIX ASPHALT AGGREGATE PAVING MATERIAL

(71) Applicant: Western Emulsions, Inc., Dana Point, CA (US)

(72) Inventors: Billy Shane McDade, Austin, TX (US); Joe Platt, Dana Point, CA (US); Andrew Clayton, Dana Point, CA (US)

(73) Assignee: WESTERN EMULSIONS, INC., Dana Point, CA (US)

( * ) Notice: Subject to any disclaimer, the term of this patent is extended or adjusted under 35 U.S.C. 154(b) by 38 days.

(21) Appl. No.: 13/751,688

(22) Filed: Jan. 28, 2013

(65) Prior Publication Data

US 2013/0195551 A1 Aug. 1, 2013

Related U.S. Application Data

(60) Provisional application No. 61/591,802, filed on Jan. 27, 2012.

(51) Int. Cl.
| | |
|---|---|
| *C08L 95/00* | (2006.01) |
| *E01C 19/00* | (2006.01) |
| *E01C 7/24* | (2006.01) |
| *C08K 3/34* | (2006.01) |

(52) U.S. Cl.
CPC .............. *C08L 95/005* (2013.01); *C08K 3/34* (2013.01); *E01C 7/24* (2013.01); *E01C 19/00* (2013.01); *C08K 2201/005* (2013.01); *C08L 2555/28* (2013.01); *C08L 2555/40* (2013.01); *C08L 2555/52* (2013.01); *C08L 2555/80* (2013.01)

(58) Field of Classification Search
CPC ....... E01C 23/065; E01C 23/00; E01C 19/00; E01C 7/24; C08L 95/00; C08L 95/005; C08L 2555/28; C08L 2555/40; C08L 2555/52; C08K 2201/005
USPC ................................................. 404/72, 75, 92
See application file for complete search history.

(56) References Cited

U.S. PATENT DOCUMENTS

| | | | | |
|---|---|---|---|---|
| 3,859,227 | A * | 1/1975 | Dwyer | 516/41 |
| 4,661,378 | A | 4/1987 | McGovern | |
| 5,180,428 | A | 1/1993 | Koleas | |
| 5,596,032 | A * | 1/1997 | Schilling et al. | 524/60 |
| 7,275,890 | B2 * | 10/2007 | Thomas et al. | 404/75 |
| 7,357,594 | B2 | 4/2008 | Takamura | |
| 2008/0276834 | A1 * | 11/2008 | Jorda | 106/277 |
| 2010/0222464 | A1 * | 9/2010 | Barnat et al. | 524/60 |
| 2011/0233105 | A1 * | 9/2011 | Bailey | 206/525 |
| 2012/0184650 | A1 * | 7/2012 | Barnat et al. | 524/60 |
| 2013/0008344 | A1 * | 1/2013 | Ranka et al. | 106/277 |
| 2013/0228098 | A1 * | 9/2013 | Crews et al. | 106/277 |
| 2014/0224154 | A1 * | 8/2014 | Guynn et al. | 106/638 |

* cited by examiner

*Primary Examiner* — Abigail A Risic

(74) *Attorney, Agent, or Firm* — Dorsey & Whitney LLP

(57) ABSTRACT

The present disclosure generally relates to formulations for, and methods of making and using, an asphalt aggregate paving material without heating the material.

6 Claims, No Drawings

COLD MIX ASPHALT AGGREGATE PAVING MATERIAL

CROSS REFERENCE TO RELATED APPLICATION

This application claims the benefit of priority under 35 U.S.C. §119(e) to U.S. Application No. 61/591,802, filed Jan. 27, 2012, titled "Cold Mix Asphalt Aggregate Paving Material," and which is hereby incorporated by reference in its entirety.

TECHNICAL FIELD

The present disclosure generally relates to formulations for, and methods of making and using, an asphalt aggregate paving material without heating the material.

BACKGROUND

Aggregate paving material is used in nearly all roads. Conventional asphalt aggregate paving materials require hot paving materials. Volatile solvents that are harmful to workers and the environment are incorporated into asphalt emulsions that are used in conventional asphalt aggregate paving materials. There is a need for asphalt aggregate paving material compositions that can be produced and applied at ambient temperatures. Further, there is a need for paving materials that do not contain volatile solvents.

The information included in this Background section of the specification is included for technical reference purposes only and is not to be regarded as subject matter by which the scope of the description is to be bound or as an admission of prior art.

SUMMARY

The present disclosure is directed to cold mix asphalt aggregate paving material. A formulation of cold mix asphalt aggregate paving material includes aggregate, an emulsion and water. The cold mix asphalt aggregate paving material is applied by applying an emulsion-coated aggregate blend to a surface and then compacting the material. A fog seal can be applied. All steps in the methods are performed at an ambient temperature range of 35° F. to 130° F.

DETAILED DESCRIPTION

The present disclosure provides formulations for, and methods of making and using, cold mix asphalt aggregate paving material. More specifically, the formulations and methods allow for the production of cold mix asphalt aggregate paving material without the use of volatile solvents or heated paving materials. The cold mix asphalt aggregate paving material requires substantially less energy, exposes road personnel to fewer hazards, and is generally far more cost effective than hot mix paving.

Components of a cold mix asphalt aggregate paving material include more than one aggregate and an asphalt emulsion, as described in more detail below.

Aggregates

Aggregates can include any mineral material known in the art. Properties of aggregates can include cubic and/or angular shape (to interlock with other particles), durability (resistance to weathering), frictional resistance, hardness (enough to resist crushing, degradation and disintegration), hydrophobicity (to resist raveling and stripping), load transmittance, low reactivity with alkalis (to avoid an expansive reaction that can lead to cracking, surface popouts and spalling), resistant to weathering (such as wetting, drying, freezing and thawing), rough surface texture (to bind with an emulsion), soundness (resistance to weathering), strength and toughness (enough to resist crushing, degradation and disintegration).

Aggregates can be acquired from a variety of sources. Aggregates can be natural or manufactured. Natural aggregates can be sedimentary rock, igneous rock and/or metamorphic rock. Specific examples of natural aggregates include, but are not limited to, basalt, caliche, chert, clay, flint, gabbro, granite, gravel, gritstone, gypsum, hornfel, limestone, perlite, porphyry, pumice, quartzite, sand, sandstone, schist, shale, slate, taconite, vermiculite or volcanic glass.

Examples of manufactured aggregates include, but are not limited to, coal fly ash, concrete, foundry sands, glass, manufactured sand, and slag, such as from the manufacture of iron and steel.

One or more than one aggregate can be combined with a binding medium, such as an asphalt emulsion, to form a compound material, such as asphalt paving material. Without being limited to any mechanism or mode of action, aggregates perform many functions in a paving material including, but not limiting to, providing durability, hardness, skid resistance, stability and strength; helping to resist raveling, rutting and stripping; and transferring loads from the surface to underlying layers.

Aggregates can be crushed (fractionated) to produce particles of various usable sizes (gradations). Without being limited to any mechanism or mode of action, particle gradations affect the density, durability, fatigue resistance, frictional resistance, permeability, resistance to moisture damage, stability, stiffness and workability of a paving material. For example, instability can result if the maximum gradation is too small. Alternatively, poor workability can result if the maximum gradation is too large.

Aggregates can be fractionated to produce a mixture of gradations. A mixture of gradations can allow smaller particles to pack between larger particles. Packing can be tight enough to reduce the void space between particles and can produce maximum or near-maximum density in a resulting paving material. Packing can also increase particle-to-particle contact, which can increase load transfer, increase stability and reduce water infiltration. Packing can be loose enough to provide adequate volume for a binder (such as emulsified asphalt) to occupy. Packing can also be loose enough to promote rapid drainage and resistance to weathering (such as in base course or subgrade).

Aggregates can be fractionated one or more times to achieve the desired particle size or sizes. In some embodiments, the aggregate particles pass through a 19.0-mm (¾-inch) sieve. In other embodiments, the aggregate particles pass through a 12.7-mm (½-inch) sieve. Alternatively, a 9.51-mm (⅜-inch) sieve, a 4.76-mm (No. 4) sieve, a 0.595-mm (No. 30) sieve, a 0.297-mm (No. 50) sieve and/or a 0.074-mm (No. 200) sieve can be used. These result in aggregate particles less than 19.0 mm in diameter, less than 12.7 mm in diameter, less than 9.51 mm in diameter, less than 4.76 mm in diameter, less than 0.595 mm in diameter, less than 0.297 mm in diameter or less than 0.074 mm in diameter, respectively.

In some embodiments, aggregates are ⅜-inch rock and manufactured sand.

Emulsions

Emulsions are added to the aggregates. Emulsions can include any asphalt emulsion known in the art. In general, an asphalt emulsion includes asphalt particles dispersed through a solution of water and a chemical surfactant. Asphalt emulsions can also contain other agents including, but not limited to, polymers, solvents and rejuvenators.

Asphalt emulsions can be made by combining asphalt particles, water and surfactant using a high shear mechanical device, such as a colloid mill. The colloid mill can shear the asphalt into tiny droplets that are dispersed through and stabilized in the water by the surfactant. Various other methods of combining asphalt particles and surfactants can be used.

Additional examples of asphalt emulsions include engineered emulsions. Examples of engineered emulsions include, but are not limited to, Fortress (Road Science, LLC, Tulsa, Okla.), PASS-R (Western Emulsions, Inc., Dana Point, Calif.), and ReFlex (Road Science, LLC, Tulsa, Okla.).

A. Asphalt

Asphalt emulsions include asphalt (bitumen). Asphalt can be any emulsifiable asphalt known in the art. Asphalt can be naturally occurring or manufactured. Manufactured asphalt can be the residual product of the nondestructive distillation of crude oil in petroleum refining.

Asphalt can be comprised of an asphaltene fraction dispersed in a maltene fraction. The asphaltene fraction is insoluble in n-pentane and soluble in toluene. Molecular components of the asphaltene fraction can be high in molecular weight, polarity and/or aromaticity. The maltene fraction can include resins, aromatic oils (aromatics) or saturate oils (saturates). The maltene fraction can include molecules ranging from non-polar, such as saturates, to polar, such as resins. Asphalt can be elastic, thermoplastic, viscous and/or waterproof.

Asphalt can meet any roadway specification known in the art. Examples of roadway specifications include, but are not limited to, ASTM D946/D946M-09a (ASTM International, "Standard Specification for Penetration-Graded Asphalt Cement for Use in Pavement Construction," Road and Paving Materials (2011)), ASTM D3381/D3381M-09a (ASTM International, "Standard Specification for Viscosity-Graded Asphalt Cement for Use in Pavement Construction," Road and Paving Materials (2011)) and ASTM D6373-07e1 (ASTM International, "Standard Specification for Performance Graded Asphalt Binder," Road and Paving Materials (2011)).

Asphalt can be acquired from any region. Regions can be described as Petroleum Administration Defense Districts (PADDs). Asphalt can be obtained from any PADD, including PADD 1, PADD 2, PADD 3, PADD 4 and PADD 5.

Asphalt can be acquired from any refiner or supplier. Examples of refiners and suppliers include, but are not limited to, Alon, BP, Calumet, Cenex, Conoco Phillips, Exxon/Mobil, Flint Hills Resources, Frontier, Holly, Husky, Imperial, Marathon, Montana Refining, Moose Jaw, Murphy Oil, NuStar, Paramount, San Joaquin, Shell, Silver Eagle, Sinclair, Suncor, Tesoro, US Oil, Valero, Western Refining, World, WRB and Wynnewood.

Asphalt can be modified with one or more polymers. Modification can be performed prior to emulsification. For example, a dry polymer can be melted into an asphalt stock.

Without being limited to any mechanism or mode of action, asphalt helps bind aggregate particles together. Polar molecules within asphalt adhere to polar molecules on aggregate surfaces. The molecular components of asphalt form dipolar intermolecular bonds of varying strength. These intermolecular bonds for a molecular network. Changes in the molecular network, including changes over time, can lead to failure of an asphalt or asphalt paving material. For example, asphalts with higher percentages of non-polar dispersing molecules can flow and plastically deform as the polar molecules move relative to one another and to the non-polar molecules. Alternatively, if the network is relatively simple and not interconnected, asphalt can deform inelastically under loads, which can lead to rutting and permanent deformation. If a network is too organized, such as when a high percentage of polar molecules is present, it can become rigid and fracture, which can lead to fatigue cracking. At lower temperatures, the non-polar molecules can become more structured, which can make asphalt more rigid and more likely to fracture, which can lead to thermal cracking. Further, water can disrupt the bonds between polar molecules in asphalt and polar molecules on aggregate surfaces, which can lead to decreased viscosity, increased rutting, reduced strength and/or stripping.

B. Surfactants

The emulsions also include one or more surfactants. Without being limited to any mechanism or mode of action, surfactants hold asphalt particles in suspension and stabilize an emulsion. Reducing the amount of surfactant in an emulsion can lead to a shorter setting time and/or shorter curing time during the paving process.

1. Cationic

Asphalt emulsions can be cationic. Surfactants in cationic asphalt emulsions can be derived from long-chain fatty acids and their acidic salts. The fatty acids can be derivatives of naturally occurring oils and fats, or they can be synthetic. In some embodiments, the fatty acids can be amidoamines, imidazolines, fatty amines, fatty diamines, fatty quaternary ammonium compounds or ethoxylated derivatives. The non-polar tails of the fatty acids are hydrophobic and can align inward toward the asphalt particles. The polar ends of the fatty acids are hydrophilic and can provide solubility in water. The surfactant molecules that surround an asphalt particle can impart a positive charge to the surface of the asphalt particle. The emulsion can be a blend of more than one surfactant. Examples of cationic surfactants include, but are not limited to, AA-86, AA-89, SBT and W-5 of the Indulin brand (Mead-Westvaco Corp., Charleston, S.C.), E-9, E-11, E-4819, E-4875 and EM24 of the Redicote brand (AkzoNobel, Amsterdam, Netherlands), and Catamine 101 (ArrMaz Custom Chemicals, Mulberry, Fla.).

In other embodiments, the emulsion is a polymer-modified cationic slow setting emulsified asphalt. A polymer-modified cationic slow setting emulsified asphalt can be any asphalt emulsion known in the art that includes polymers (as described below) is cationic (as described above) and is slow setting (as described below). A preferred emulsion is PASS-R (Western Emulsions, Inc., Dana Point, Calif.).

In many embodiments, the emulsion is a polymer-modified cationic slow setting emulsified asphalt with a solvent-free rejuvenator. A polymer-modified cationic slow setting emulsified asphalt with a solvent-free rejuvenator can be any polymer-modified cationic slow setting emulsified asphalt (as described above) with a solvent-free rejuvenator (as described below). A preferred emulsion is PASS-R (Western Emulsions, Inc., Dana Point, Calif.).

2. Anionic

Asphalt emulsions can be anionic. Surfactants in anionic asphalt emulsions can be derived from long-chain fatty acids reacted with a base to form a salt. Such fatty acids can be derivatives of naturally occurring oils and fats, or they can be synthetic. In some embodiments, the fatty acids can be wood or paper-processing derivatives such as hydoxystearic acid, lignin sulfonates, rosin acids or tall oil fatty acids. In other embodiments, the fatty acids can be petroleum sulfonates such as alphaolefin sulfonates. In still other embodiments, the fatty acids can be from lauric, linoleic, myristic, palmitic, oleic or ricinoleic acids. In some embodiments, the base can be caustic potash (KOH) or caustic soda (NaOH). The non-polar tails of the fatty acids are hydrophobic and can align inward toward the asphalt particles. The polar ends of the fatty acids are hydrophilic and can provide solubility in water. The surfactant molecules that surround an asphalt particle can impart a negative charge to the surface of the asphalt particle. Examples of an anionic surfactants include, but are not limited to, some of the Indulin brand of surfactants, such as W-5 (MeadWestvaco Corp., Charleston, S.C.).

3. Nonionic

Asphalt emulsions can be nonionic. Surfactants in nonionic asphalt emulsions can be derived from neutrally charged long-chain fatty acids. The fatty acids can be derivatives of naturally occurring oils and fats, or they can be synthetic. In some embodiments, the surfactant in nonionic asphalt emulsions can include long chain polyoxyethylene or polyoxypropylene groups in fatty acid, alcohol, amide or amine molecules. These surfactants can be hydrophilic due to oxygenated side chains (i.e., polyoxyethylene or polyoxypropylene chains combined with the oil-soluble fatty acid, alcohol amine or amide component of the molecule). Emulsions can include a blend of more than one surfactant. One example of a nonionic surfactant is the Witconol brand of nonyl phenol ethoxylates (AkzoNobel, Amsterdam, Netherlands).

C. Rejuvenators

Asphalt emulsions can also contain one or more rejuvenators. An example of a rejuvenator is a composition derived from coal tar and comprising a mixture of di-, tri- and tetra-cyclic aromatic compounds and their alkyl homologs containing lower alkyl groups together with a significant amount of phenolic and hydroxy derivatives (McGovern, U.S. Pat. No. 4,661,378).

Another example of a rejuvenator is a recycling agent. For example, a recycling agent can contain the maltene fraction of asphalt (as described below). In some variations, a recycling agent can contain a subset of the maltene fraction of asphalt such as one or more of polar resins, aromatic oils or saturate oils. Alternatively, the recycling agent can contain a relatively high percentage of aromatic oils and polar materials. Examples of suitable recycling agents include an RA-1 grade recycling agent, the Hydrolene brand of asphalt modifiers (HollyFrontier/Sunoco, Tulsa, Okla.) and the Cyclogen and Reclamite brands of asphalt preservations materials (Tricor Refining, LLC, Bakersfield, Calif.).

Asphalt emulsions also can be rejuvenating asphalt emulsions. One example of a rejuvenating asphalt emulsion is a composition that includes a predominantly maltene recycling agent, a rubbery polymer or latex selected from styrene-butadiene-styrene, styrene butadiene rubber, neophrene latex and natural rubber, an surfactant, and water (Koleas, U.S. Pat. No. 5,180,428). Another example is a composition that includes an asphalt binder, water, a cationic surfactant, a recycling agent and a cationic co-agglomerated styrene butadiene rubber latex, which includes sulfur and a vulcanizing agent (Takamura, U.S. Pat. No. 7,357,594).

Without being limited to any mechanism or mode of action, rejuvenators and rejuvenating asphalt emulsions increase the life span of asphalt pavement. Rejuvenators and rejuvenating asphalt emulsions can penetrate asphalt to restore essential oils (maltenes), soften asphalt, revitalize or reactivate binder properties, help aggregates adhere to and repair damage within the asphalt matrix. Rejuvenators and rejuvenating asphalt emulsions can increase ductility, increase flexibility, reduce viscosity, reduce brittleness, reduce ravel and enrich oxidized pavement. Rejuvenators and rejuvenating asphalt emulsions can form a polymer-rich, thin, stress-absorbing membrane that can strongly adhere to an underlying pavement. Rejuvenators and rejuvenating asphalt emulsions can seal pavement and can make pavement resistant to fuels, oils, water and salts.

In some embodiments, the emulsion includes a solvent-free rejuvenator. Solvent-free rejuvenators can be rejuvenators (as described above) without volatile solvents. Without being limited to any mechanism or mode of action, solvent-free rejuvenators can increase stockpile life of recycled RAP.

D. Polymers

Asphalt emulsions can also contain one or more polymers. A polymer can be natural or synthetic. Example polymers include, but are not limited to, acrylic, acrylic terpolymer, acrylonitrile-butadiene, butyl rubber, ethylene methacrylate copolymer, ethylene vinyl acetate copolymer, ethylene vinyl chloride, natural rubber, neoprene, nitrile, polyurethane, polyvinylidene chloride, polyvinyl acetate, polyvinyl alcohol, silicone, vinylacrylic, vinyl acetate-ethylene, vinyl ester copolymer, and block copolymers such as styrene acrylate, styrene butadiene, styrene-ethylene-vinyl acetate and sytrene-isoprene. Polymers can be added to an emulsion in any form known in the art including, but not limited to, crumb, pellet, powder or water-suspended form. Suitable polymers include PA-AS-1 (Polymer Science of America, LLC, Tuscon, Ariz.).

Polymers can be added to asphalt prior to emulsification. For example, a dry polymer can be melted into an asphalt stock.

Without being limited to any mechanism or mode of action, polymers modify the physical properties of asphalt. Polymers can dissolve into some component fractions of asphalt such that the polymer molecules create an inter-connected matrix of polymer through the asphalt. Polymers can be thermoplastic and break up, such as into monomers, when exposed to heat (for example, during some asphalt pavement mixing and laying steps) and recombine at lower temperatures (for example, ambient temperatures).

Polymers can add strength, increase elasticity, increase ductility, decrease brittleness, improve adhesion, improve cohesion, increase durability, extend life and improve temperature stability of a cold mix asphalt aggregate paving material. Polymers can reduce pavement cracking, such as that caused by thermal stresses and repetitive loads. Polymers can decrease rutting, such as that due to plastic or inelastic deformations of asphalt pavement mixtures. Polymer-modified asphalt emulsions can be less brittle at low temperatures to resist cracking. Polymer-modified asphalt emulsions can be stiffer at high temperatures to resist rutting and bleeding.

In some embodiments, polymers in an asphalt emulsion improve structural stability of a cold mix asphalt aggregate paving material. Structural stability can include resistance to forces, such as shear and bending forces, and resistance to plastic flow. Structural stability can be determined by Marshall Stability testing. Marshall Stability tests are used to measure the resistance to plastic flow of cylindrical specimens of asphalt mixtures loaded on the lateral surface by means of the Marshall apparatus. Marshall Stability tests can be performed according to ASTM D5581-07ae1, Standard Test Method for Resistance to Plastic Flow of Bituminous Mixtures Using Marshall Apparatus (6 inch Diameter Specimen) or ASTM D6927-06, Standard Test Method for Marshall Stability and Flow of Bituminous Mixtures, which are incorporated herein by reference in their entirety.

E. Solvents

In some embodiments, the emulsion is free of volatile solvents (or as referred to herein, "solvent-free"). Without being limited to any mechanism or mode of action, the absence of volatile solvents can increase stockpile life of cold mix asphalt aggregate paving material.

"Volatile solvents" include any organic compound with an initial boiling point ("IBP") of 500° F. or less as determined by ASTM D244-09 (ASTM International, "Standard Test Methods and Practices for Emulsified Asphalts," Road and Paving Materials (2011)). Examples of solvents include, but are not limited to, diesel fuel, fuel oil, gasoline, jet fuel, kerosene and naphtha. A "solvent-free" emulsion is an emulsion that contains no organic compound with an IBP of 500° F. or less.

In some variations, the emulsion can be substantially solvent-free. An emulsion that is substantially solvent-free can include less than 0.5% by volume of a volatile solvent.

F. Water

Asphalt emulsions include water. An asphalt emulsion can be more than 15% water. In some embodiments, an asphalt emulsion is more than 25% water. In other embodiments, an asphalt emulsion is more than 35% water.

An asphalt emulsion can be less than 55% water. In some embodiments, an asphalt emulsion is less than 45% water. In other embodiments, an asphalt emulsion is less than 35% water.

Emulsion Setting

Asphalt emulsions can coalesce (i.e., set or break) under a variety of conditions. For example, when an asphalt emulsion and an aggregate are oppositely charged, electrostatic attraction between the particles can lead to flocculation and coalescence. When an asphalt emulsion and an aggregate carry the same charge, the particles often are forced together, such as by pumping at high shear or freezing, before flocculation and coalescence can occur. Removal of water by any method, such as by heating to cause evaporation, can also lead to flocculation and coalescence.

Asphalt emulsions can set at different rates. The actual setting times in the field depend not only on the type of emulsion used, but also upon other factors. For example, ambient temperature, humidity and wind speed affect water evaporation rates, surfactant migration and surfactant water release characteristics. These effects can change the rate at which emulsion in a cold mix asphalt aggregate paving material sets. Alternatively, the size distribution and number of fine aggregates in a cold mix asphalt aggregate paving material can accelerate the setting rate. Alternatively, intensity of the charge on the surface of aggregate particles can affect the setting rate. High surface charge can lead to more rapid setting. Alternatively, cool emulsion and aggregate temperatures can retard setting. Warm or hot emulsion and aggregate temperatures can accelerate setting. Alternatively, compactive effort can affect the setting rate.

A. Slow Setting

Asphalt emulsion can be slow setting. Slow setting emulsions are largely unreactive and highly stable. They can be used with reactive aggregates. When slow setting emulsions are used with fine aggregates, they allow for maximum mixing time and extended workability. Slow setting emulsions can be described by ASTM D977-05 (ASTM International, "Standard Specification for Emulsified Asphalt," Road and Paving Materials (2011)) and ASTM D2397-05 (ASTM International, "Standard Specification for Cationic Emulsified Asphalt," Road and Paving Materials (2011)). Examples of slow setting emulsions include, but are not limited to, CSS-1, CSS-1h, SS-1 and SS-1h.

B. Rapid Setting

Asphalt emulsion can be rapid setting. Rapid setting emulsions are reactive and can be used with largely unreactive aggregates. Rapid setting emulsions can set quickly when used with coarse aggregates. Rapid setting emulsions can be described by ASTM D977-05 (ASTM International, "Standard Specification for Emulsified Asphalt," Road and Paving Materials (2011)) and ASTM D2397-05 (ASTM International, "Standard Specification for Cationic Emulsified Asphalt," Road and Paving Materials (2011)). Examples of rapid setting emulsions include, but are not limited to, CRS-1, CRS-2, CRS-2h, CRS-2p, LMCRS-2, LMCRS-2h, RS-1, RS-2, RS-1h and RS-2h.

C. Medium Setting

Asphalt emulsion can be medium setting. Medium setting emulsions can set less quickly than rapid-setting emulsions when used with coarse aggregates. Medium setting emulsions can set more quickly than slow-setting emulsion when used with fine aggregates. Medium setting emulsions can be described by ASTM D977-05 (ASTM International, "Standard Specification for Emulsified Asphalt," Road and Paving Materials (2011)) and ASTM D2397-05 (ASTM International, "Standard Specification for Cationic Emulsified Asphalt," Road and Paving Materials (2011)). Examples of medium setting emulsions include, but are not limited to, CMS-2, CMS-2h, HFMS-2, MS-1, MS-2 and MS-2h.

Combining Aggregate with Emulsion

Without being limited to any mechanism or mode of action, emulsions can coat aggregates. For example, electrostatic interactions between an emulsion and aggregate can cause components of the emulsion to plate out on, or adhere to, the surfaces of the aggregate. In another example, adhesion forces between the emulsion and aggregate exceed cohesion forces between the emulsified asphalt particles such that the emulsion adheres to the aggregate. Emulsion adherence on the aggregate can lead to flocculation and coalescence.

In various embodiments, aggregates are coated with emulsion. Coating of more than one aggregate with emulsion can form an emulsion-coated aggregate blend. Coating of aggregate with emulsion can increase the rate at which the coated aggregate sets, allow for strong bonds to form between the emulsion and aggregate and/or provide a smooth compacted asphalt aggregate paving material when applied to a surface.

An emulsion can be combined with aggregate in a fast continuous mixing machine, such as a pug mill. A pug mill simultaneously grinds materials and mixes them with liquid. A pug mill can produce a thoroughly mixed, homogeneous mixture in a few seconds. Water can also be combined with an emulsion and aggregate in a pug mill.

In some embodiments, the emulsion is greater than 1% by weight of aggregate. In some embodiments, the emulsion is greater than 2% by weight of aggregate. In other embodiments, the emulsion is greater than 3% by weight of aggregate. In other embodiments, the emulsion is greater than 4% by weight of aggregate. In still other embodiments, the emulsion is greater than 5% by weight of aggregate.

In some embodiments, the emulsion is less than 8% by weight of aggregate. In some embodiments, the emulsion is less than 7% by weight of aggregate. In other embodiments, the emulsion is less than 6% by weight of aggregate. In still other embodiments, the emulsion is less than 5% by weight of aggregate.

In some embodiments, the emulsion is 4-5.5% by weight of aggregate. In some embodiments, the emulsion is 4.5% by weight of aggregate.

The weight percent of emulsion used can be adjusted based on field conditions including, but not limited to, the ambient temperature and the desired setting time. For example, because lower ambient temperatures can lead to longer setting times, a higher weight percent of emulsion can be used to decrease the setting time.

Water

Water can be added to asphalt aggregate paving material. Without being limited to any mechanism or mode of action, water helps an asphalt emulsion coat aggregate. Water can also reduce the amount of emulsion that produces an emulsion-coated aggregate. Water can also reduce the likelihood of an asphalt emulsion setting while in a stockpile.

Water can be added to aggregate at any time during the production of cold mix asphalt aggregate paving material. For example, water can be added to aggregate before emulsion is added. Alternatively, water can be added to aggregate at the same time as an emulsion is added, or water can be added to aggregate after an emulsion is added.

In many variations, the quantity of water added to cold mix asphalt aggregate paving material depends on the type of aggregate used. Each type of aggregate can absorb water. The potential absorption is reached when each aggregate particle pore is filled with water and there is no excess water on the aggregate particle surface. When the amount of water in an aggregate is equal to the aggregate's potential absorption, surface saturation has been reached. When more than one type of aggregate is used, the amount of water added can be based upon the surface saturation of the aggregate that has the greater potential absorption. One example of an aggregate surface saturation is 2.5 w/w % water.

Water can be added to an aggregate so that the total moisture content (i.e. total water content) is equal to potential absorption. Alternatively, water can be added to an aggregate in quantities such that the total moisture content exceeds potential absorption.

In some embodiments, cold mix asphalt aggregate paving material already has the desired water content and no additional water is added.

Water can added to a final concentration 0.5% greater than aggregate surface saturation. In some embodiments, water is added to a final concentration 1% greater than aggregate surface saturation. In other embodiments, water is added to a final concentration 2% greater than aggregate surface saturation.

Water can be added to a final concentration 3% greater than aggregate surface saturation. In some embodiments, water is added to a final concentration 4% greater than aggregate surface saturation. In some embodiments, water is added to a final concentration 5% greater than aggregate surface saturation. In other embodiments, water is added to a final concentration 6% greater than aggregate surface saturation. In still other embodiments, water is added to a final concentration 7% greater than aggregate surface saturation.

In some embodiments, water is added to a final concentration 2-4% greater than aggregate surface saturation. In other embodiments, water is added to a final concentration 2-3% greater than aggregate surface saturation.

In some embodiments, water is added to a final concentration of 4-5.5% total moisture content. In other embodiments, water is added to a final concentration of 4-6.5% total moisture content.

If asphalt aggregate paving material is stored, water can be added before, during or after being stored. The amount of water added can be based on the desired storage duration. More water can be added for longer storage. Water can added based on the moisture content results obtained from testing stored samples.

Temperature

Making, using, laying and compacting a paving material can be done without the use of heat. Making, using, laying and compacting a paving material can be performed at an ambient temperature greater than 35° F., greater than 50° F., greater than 65° F., greater than 80° F., greater than 95° F., or greater than 110° F. Making, using, laying and compacting a paving material can be performed at an ambient temperature less than 130° F., less than 115° F., less than 100° F., less than 85° F., less than 70° F., or less than 55° F., In some embodiments, making, using, laying or compacting the paving material is performed at an ambient temperature range of 35° F. to 130° F. In some embodiments, making, using, laying or compacting the paving material is performed at an ambient temperature range of 45° F. to 120° F.

Applying a fog seal emulsion can be done without the use of heat. Any of the above temperatures or temperature ranges for making, using, laying or compacting a paving material can be used for applying a fog seal emulsion.

Additional Components of Cold Mix Asphalt Aggregate Paving Material

Any material that can be added to asphalt pavement can be added to cold mix asphalt aggregate paving material. Examples of such materials include, but are not limited to, cement, lime, roofing shingles and tire rubber. Roofing shingles can be asphalt composite shingles.

Materials can be reduced in size before being added to cold mix asphalt aggregate paving material. Materials can be reduced in size by any mechanism known in the art including, but not limited to, crushing, fractionating, ripping and shredding.

Any one or more of these materials can be added to cold mix asphalt aggregate paving material at any time. For example, one or more of these materials can be added during production, such as in a pug mill. Alternatively, one or more of these materials can be added immediately prior to laying the cold mix asphalt aggregate paving material on a surface.

Laying Cold Mix Asphalt Aggregate Paving Material

Cold mix asphalt aggregate paving material can be applied to (laid on) a surface by any device or method known in the art. Examples of devices for laying cold mix asphalt aggregate paving material include motor graders and lay-down machines.

Cold mix asphalt aggregate paving material can be laid at any desired thickness to create a mat. For example, two to four inches of cold mix asphalt aggregate paving material can be laid.

Compaction

Cold mix asphalt aggregate paving material can be compacted by any device or method known in the art. Without being limited to any mechanism or mode of action, a compaction device provides compactive effort from, for example, its weight, its speed and by creating shear stress between compressed material and adjacent uncompressed material. Compactive effort rearranges aggregates in an asphalt pavement, densifies an asphalt pavement, reduces the volume of air in an asphalt pavement and forces water out of an asphalt pavement. Complete removal of water can help an asphalt pavement, such as cold mix asphalt aggregate paving material, cure and achieve its full strength.

One example of a compaction device is a screed. A screed can be part of a paver, in which a self-leveling screed unit determines the profile of the asphalt material being placed by striking it off at the correct thickness. The screed can also provide initial mat compaction.

Another example of a compaction device is a pneumatic tire roller. Pneumatic tire rollers can include a front and back row of tires that are staggered such that the tires in one row are aligned with the gaps between tires in the other row. This tire arrangement can provide uniform and complete compaction over the width of the device. The tires can be smooth (without a tread). Tire pressure can be adjusted to change compactive effort. A release agent such as water can be used to minimize sticking of asphalt binder to the tires. The tire area can be insulated, such as with rubber matting or plywood, to help maintain tire temperature at or near pavement temperature during compaction.

Device weight and compactive effort can be adjusted by adding or removing ballast. Ballast can be any material known in the art including, but not limited to, water, sand, wet sand and steel.

A pneumatic tire roller can provide a kneading action. The kneading action can force water out of cold mix asphalt aggregate paving material, which can help cold mix asphalt aggregate paving material set and cure.

Another example of a compaction device is a drum (steel wheel or road) roller. Drum rollers can include one or more drums, which can compact material such as cold mix asphalt aggregate paving material. The drums can be steel.

Drums can be static or vibrating. Drum vibration can add a dynamic load to the device weight which can create a greater total compactive effort. Drum vibration can also reduce friction and aggregate interlock during compaction, which allows aggregate particles to move into final positions that produce greater friction and interlock than could be achieved without vibration. Drum vibration can be produced using a free-spinning hydrostatic motor inside the drum; an eccentric weight can be attached to the motor shaft. Amplitude (eccentric moment) and frequency (speed of rotation) of vibration can be adjusted. Vibration amplitude and frequency can have a direct effect on dynamic force and thus on the compactive force.

A release agent such as water can be used to minimize sticking of asphalt binder to the drums.

Device weight and compactive effort can be adjusted by adding or removing ballast. Ballast can be any material known in the art including, but not limited to, water, sand, wet sand and steel.

Cold mix asphalt aggregate paving material can be compacted by a series of compaction devices. Without being limited to any mechanism or mode of action, a series of compaction devices can produce a cold mix asphalt aggregate paving material pavement with a greater density and greater smoothness than can be produced with a single method of compaction. The types of compaction devices used, number of devices used, sequence in which the devices are used and device speed can be varied based on the amount and type of compaction desired. The area on which each device is used, number of passes made by each device and pattern that each device follows can also be varied based on the amount and type of compaction desired.

One example of a compaction sequence includes the use of a screed. A screed can be used in a vibratory mode.

A screed can be followed by one or more rollers, including a breakdown roller. A breakdown roller can be any roller known in the art, including a vibratory drum roller or pneumatic tire roller.

A breakdown roller can be followed by an intermediate roller. An intermediate roller can be any roller known in the art, including a drum roller or pneumatic tire roller. A finish roller can be the last roller in a sequence. A finish roller can be any roller known in the art, including a static steel drum roller In some embodiments, a cold mix asphalt aggregate paving material mat is compacted immediately after it has been laid. In other embodiments, a cold mix asphalt aggregate paving material mat is compacted after it has set. In some embodiments, a cold mix asphalt aggregate paving material mat is compacted immediately after laying by a finish roller producing high-amplitude, low-frequency vibrations. In some embodiments, a cold mix asphalt aggregate paving material is compacted the morning after laying by a pneumatic roller. In other embodiments, a cold mix asphalt aggregate paving material is compacted both immediately after laying and the day after laying.

The devices and methods for compaction of cold mix asphalt aggregate paving material can be adjusted based upon field conditions. The number and timing of passes made to compact cold mix asphalt aggregate paving material can also be adjusted based upon field conditions. Any condition known in the art that affects the application of asphalt pavements to a surface including, but not limited to, the water content of the emulsion, the water content of the cold mix asphalt aggregate paving material or the setting time of cold mix asphalt aggregate paving material, can affect the compaction of cold mix asphalt aggregate paving material.

For example, the rate at which water is absorbed by the cold mix asphalt aggregate paving material can affect setting time. Faster absorption can lead to faster setting and less need for compaction of cold mix asphalt aggregate paving material. Alternatively, ambient temperature, humidity and wind speed affect water evaporation rates, surfactant migration and surfactant water release characteristics. These effects can change the rate at which cold mix asphalt aggregate paving material sets. Alternatively, pressure from rollers can force water out of the cold mix asphalt aggregate paving material. Pressure from rollers can also improve mix cohesion, cure and stability. Heavier rollers apply more pressure than lighter rollers. The type of roller or number of passes made by a roller can be based on how much pressure it will take to force water out or improve mix cohesion, cure or stability. Alternatively, the size distribution and number of fines can accelerate the rate at which asphalt pavement sets. Alternatively, intensity of the charge on the surface of aggregates can affect the asphalt pavement setting rate. High surface charge can lead to more rapid setting. Alternatively, cool emulsion and aggregate temperatures can retard setting. Warm or hot emulsion and aggregate temperatures can accelerate setting. Alternatively, different types of surfactants can be designed to have different effects on setting rate. Varying the amount of surfactant used can further affect setting rate.

Fog Seal Emulsion

In various embodiments, the Marshall stability of laid down and compacted cold mix asphalt aggregate paving material can be 900 kg or greater, and the density can be from 80-85%. A fog seal emulsion can be applied after cold mix asphalt aggregate paving material has been laid down and compacted. Fog seal emulsions can be cationic, anionic or nonionic emulsions (as described above). Fog seal emulsions can include polymers (as described above). Fog seal emulsions can include solvents (as described above). Fog seal emulsions can include rejuvenators (as described above). Fog seal emulsions can be diluted versions of emulsions (as described above). One example of a fog seal emulsion is a composition that includes a predominantly asphaltene asphalt, a predominantly maltene recycling agent, a rubbery polymer or latex selected from styrene-butadiene-styrene, styrene butadiene rubber, neophrene latex and natural rubber, an surfactant and water (Koleas, U.S. Pat. No. 5,180,428). Another example of a fog seal emulsion is a composition that includes an asphalt binder, water, a cationic surfactant, a recycling agent and a cationic co-agglomerated styrene butadiene rubber latex, which includes sulfur and a vulcanizing agent (Takamura, U.S. Pat. No. 7,357,594).

Without being limited to any mechanism or mode of action, fog seal emulsions extend the life of cold mix asphalt aggregate paving material. Fog seal emulsions decrease permeability, improve the ability of cold mix asphalt aggregate paving material to prevent water from penetrating a base course or subgrade, reduce oxidation, close or seal cracks, reduce shrinkage, restore flexibility and fix construction defects.

In some embodiments, a fog seal emulsion is a highly polymerized cationic asphalt emulsion. A highly polymerized cationic asphalt emulsion can be any asphalt emulsion known in the art that includes polymers (as described above) and is cationic (as described above). Suitable fog seal emulsions include FastSet (Western Emulsions, Inc., Dana Point, Calif.).

As described above, applying a fog seal emulsion can be done without the use of heat. Any of the above temperatures or temperature ranges for making, using, laying or compacting a paving material can be used for applying a fog seal emulsion.

Storing Cold Mix Asphalt Aggregate Paving Material

Cold mix asphalt aggregate paving material can be used immediately after production. Alternatively, cold mix asphalt aggregate paving material can be stored (stockpiled) before being used. Cold mix asphalt aggregate paving material can be stored with or without the addition of one or more additives including, but not limited to, emulsions, polymers, solvents, rejuvenators and water.

Without being limited to any mechanism or mode of action, addition of a solvent-free rejuvenator (as described above) to cold mix asphalt aggregate paving material extends the stockpile life of cold mix asphalt aggregate paving material. Stockpile life of a cold mix asphalt aggregate paving material can be the time during which aggregate particles are able to adhere to each other or are compactable. A solvent-free rejuvenator stays in the cold mix asphalt aggregate paving material and does not evaporate out of the stockpile.

Without being limited to any mechanism or mode of action, use of an emulsion with a soft asphalt in the preparation of cold mix asphalt aggregate paving material extends the stockpile life of cold mix asphalt aggregate paving material.

Courses and Grades

Cold mix asphalt aggregate paving material can be used for any paving purpose known in the art. For example, cold mix asphalt aggregate paving material can be used for shoulder widening, pothole patching, as a base material, and as a wearing course. The wearing course, or surface course, is the top layer of a road pavement and is usually designed to be durable, resistant to water penetration, resistant to deformation by traffic and have a high resistance to skidding.

Kits

In some embodiments, any two or more of an aggregate, an emulsion, and water can be combined to comprise a kit. A kit can contain more than one aggregate. A kit can include one or more aggregates that have been combined with an emulsion to form an emulsion-coated aggregate blend. In some embodiments, a kit includes instructions for combining or using the one or more aggregate, emulsion, water and emulsion-coated aggregate blend.

EXAMPLES

The following examples illustrate various aspects of the disclosure, and should not be considered limiting.

Example 1

Emulsion Testing

Using a sample of limestone aggregate, an aggregate gradation that met Texas Department of Transportation ("Tx-DOT") criteria for Type D hot mix asphalt ("HMA") was used, and molds were made with this material using three types of emulsions: CMS-2S (a solvent-containing emulsion), RM-90 (a "cutback"-type emulsion that contains a large percentage of diesel fuel), and PASS-R (Western Emulsions, Inc., Dana Point, Calif.). CMS-2S did not coat the aggregate sufficiently to produce a mold for testing, so no further testing was performed on cold mix asphalt aggregate paving material using this type of emulsion. RM-90 and PASS-R both coated the aggregate material at 4.5% emulsion content, so testing was continued on these types of emulsions. During this initial testing, 2.5% moisture was added to the cold mix asphalt aggregate paving material, representing the surface saturation level of the aggregate, as determined by the aggregate supplier.

Example 2

Gradation Testing

During the initial testing, it was noticed that the fines in the aggregate gradation tended to ball up, resulting in balls of fines that were coated with emulsion, but the fines inside the balls were not. This led to a modification in the gradation to reduce the amount of fines in the aggregate blend. This resulted in a gradation that did not ball up and could therefore be fully coated with emulsion. Using aggregate of this new gradation had the added benefit of using only two types of aggregates (⅜-inch rock and manufactured sand) rather than three in the blend (the HMA aggregate contained field sand as well as the other two types), which meant that cold mix asphalt aggregate paving material can be produced with only two bins feeding a pug mill, rather than three, which is common in HMA.

Example 3

Cold Testing

After the appropriate aggregate was determined and CMS-2S was eliminated as a potential emulsion type for cold mix asphalt aggregate paving material, complete mix designs were done on RM-90 and PASS-R. The test methodologies used in these designs were the same as those established for HMA testing, with the exception that no heat was ever used at any point during the testing process, including preparing the cold mix asphalt aggregate paving material, molding the material, curing the molds or testing the molds. This was done for the obvious reason that since no heat was to be used in the field production of cold mix asphalt aggregate paving material, no heat should be used in the lab, so that the lab results would accurately reflect the field results. In the past, heat was commonly used to test similar material that was produced for pothole patching purposes. The results of the lab testing showed that PASS-R far outperformed RM-90 for use in cold mix asphalt aggregate paving material production. For example, cold mix asphalt aggregate paving material processed with PASS-R cured much more rapidly than cold mix asphalt aggregate paving material processed with RM-90 when compacted without the use of heat. Although the material processed with RM-90 did produce molds, after several days it still had not cured and could be broken by hand. Thus, the cold mix asphalt aggregate paving material produced with RM-90 could not be tested.

Example 4

Density Testing

Cold mix asphalt aggregate paving material produced with PASS-R emulsion was structurally sound, as evidenced by the results of Marshall Stability testing. At 55% ⅜-inch aggregate and 45% manufactured sand, Marshall Stability test results were 765 lbs and 10 flow (deformation). At 65% ⅜-inch aggregate and 35% manufactured sand, test results were 835 lbs and 9 flow. The lack of heat during compaction meant that the material could achieve only 80-85% density.

Example 5

Fog Seal Testing

The low density discovered in Example 4 could potentially lead to moisture damage to roadways paved with cold mix asphalt aggregate paving material. For this reason, an appropriate "fog-seal"-type surface treatment is used on roadways paved with cold mix asphalt aggregate paving material before the roadway is subject to a freeze/thaw cycle. A fog-seal emulsion developed by Western Emulsions and marketed under the name FastSet was used. Lab testing showed that applying FastSet fog-seal to cold mix asphalt aggregate paving material prevented moisture damage.

Example 6

Field Testing

After design testing showed the best way to produce cold mix asphalt aggregate paving material, a field trial was performed in the City of Ada, Okla. The trial was successful, and several roads in Ada have now been paved with cold mix asphalt aggregate paving material.

During the field trials, the initial mix design was changed in two ways. First, to promote rapid curing of the paving material, the formulation of PASS-R emulsion was altered to reduce the amount of emulsifier. Also, it was discovered that the material performs better when moisture is added at an amount that is higher than the saturation point of the aggregate. Careful records were kept on the moisture content of cold mix asphalt aggregate paving material as produced, and it was determined that optimum moisture for cold mix asphalt aggregate paving material is 2%-3% higher than aggregate saturation, depending on aggregate type.

Example 7

Nuclear Density Testing

Nuclear density testing was performed during paving with cold mix asphalt aggregate paving material in Ada, Okla., and it was determined that maximum density is achieved with two passes of a finish ("steel-drum") type roller at high-amplitude, low-frequency vibration immediately upon laying the cold mix asphalt aggregate paving material and two passes of a pneumatic roller the following morning. This will change on other cold mix asphalt aggregate paving material projects depending on the weight of the rollers used, but the compactive effort based on the weight of the rollers can be calculated and the number of required passes can be adjusted accordingly. A straight down and back roll pattern has been shown to be optimum.

The above specification and examples provide a complete description of the structure and use of exemplary embodiments of cold mix asphalt aggregate paving material. Although various embodiments have been described above with a certain degree of particularity, or with reference to one or more individual embodiments, those skilled in the art could make numerous alterations to the disclosed embodiments without departing from the spirit or scope of this disclosure. Other embodiments are therefore contemplated. All matter contained in the above description is illustrative only of particular embodiments and not limiting. Changes in detail or structure may be made without departing from the basic elements described herein.

What is claimed is:

1. A cold mix asphalt aggregate paving material comprising:
   more than one aggregate;
   an emulsion; and
   water at 2-4% greater than aggregate surface saturation.

2. The cold mix asphalt aggregate paving material of claim 1, wherein said more than one aggregate and said emulsion are combined to form an emulsion-coated aggregate blend.

3. The cold mix asphalt aggregate paving material of claim 1, wherein said emulsion is a polymer-modified cationic slow setting emulsified asphalt with a solvent-free rejuvenator.

4. The cold mix asphalt aggregate paving material of claim 1, wherein said emulsion is greater than 1% by weight of the more than one aggregate.

5. The cold mix asphalt aggregate paving material of claim 1, wherein said emulsion is less than 8% by weight of the more than one aggregate.

6. The cold mix asphalt aggregate paving material of claim 1, wherein of said more than one aggregate, 100% passes through a 19.0-mm sieve, 98-100% passes through a 12.7-mm sieve, 85-100% passes through a 9.51-mm sieve, 50-70% passes through a 4.76-mm sieve, 28-40% passes through a 0.595-mm sieve, 2-15% passes through a 0.297-mm sieve, and 0-5% passes through a 0.074-mm sieve.

* * * * *